US012681374B2

(12) United States Patent
Nakashima et al.

(10) Patent No.: US 12,681,374 B2
(45) Date of Patent: Jul. 14, 2026

(54) FLUORESCENCE EMITTING ELEMENT, FLUORESCENCE EMITTING MODULE, AND LIGHT EMITTING DEVICE

(71) Applicant: Panasonic Intellectual Property Management Co., Ltd., Osaka (JP)

(72) Inventors: Noriyasu Nakashima, Osaka (JP); Yosuke Honda, Nara (JP); Shinichi Kitaoka, Osaka (JP); Yoshiyuki Takahira, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 365 days.

(21) Appl. No.: 18/039,100

(22) PCT Filed: Oct. 20, 2021

(86) PCT No.: PCT/JP2021/038699
§ 371 (c)(1),
(2) Date: May 26, 2023

(87) PCT Pub. No.: WO2022/118555
PCT Pub. Date: Jun. 9, 2022

(65) Prior Publication Data
US 2024/0085772 A1 Mar. 14, 2024

(30) Foreign Application Priority Data
Dec. 4, 2020 (JP) ................................. 2020-202120

(51) Int. Cl.
*G03B 21/20* (2006.01)
*G03B 21/16* (2006.01)

(52) U.S. Cl.
CPC ........... *G03B 21/204* (2013.01); *G03B 21/16* (2013.01)

(58) Field of Classification Search
CPC .... G03B 21/204; G03B 21/16; H04N 9/3144; H04N 9/3158; H04N 9/3161
See application file for complete search history.

(56) References Cited

U.S. PATENT DOCUMENTS

2016/0238922 A1 8/2016 Furuyama et al.
2016/0341395 A1 11/2016 Kiyota et al.
(Continued)

FOREIGN PATENT DOCUMENTS

CN 105737103 A * 7/2016
CN 109751564 5/2019
(Continued)

OTHER PUBLICATIONS

International Search Report issued in International Pat. Appl. No. PCT/JP2021/038699, dated Dec. 21, 2021, along with an English translation thereof.

*Primary Examiner* — Ryan D Howard
(74) *Attorney, Agent, or Firm* — Greenblum & Bernstein, P.L.C.

(57) ABSTRACT

A fluorescence emitting element includes: a wavelength conversion member that is plate-shaped and includes a fluorescent material, the wavelength conversion member including a first principal surface and a second principal surface that is on an opposite side from the first principal surface; and a metal film bonded to at least one surface out of the first principal surface and the second principal surface. In a plan view of the wavelength conversion member, the wavelength conversion member includes a region that does not overlap the metal film, and the metal film includes a bonding surface that is bonded to the at least one surface, and an exposed surface on an opposite side from the bonding surface.

7 Claims, 10 Drawing Sheets

(56)                    References Cited

U.S. PATENT DOCUMENTS

| 2017/0099467 | A1 |   | 4/2017 | Egawa |
|---|---|---|---|---|
| 2019/0094671 | A1 |   | 3/2019 | Ikeo |
| 2019/0121119 | A1 | * | 4/2019 | Chen .................. G03B 21/2066 |
| 2019/0137062 | A1 |   | 5/2019 | Lee et al. |
| 2021/0098662 | A1 |   | 4/2021 | Li et al. |

FOREIGN PATENT DOCUMENTS

| JP | 2006-058338 | 3/2006 |
|---|---|---|
| JP | 2012-009242 | 1/2012 |
| JP | 2015-215583 | 12/2015 |
| JP | 2016-219779 | 12/2016 |
| JP | 2017-073244 | 4/2017 |
| JP | 2019-061235 | 4/2019 |
| JP | 2020-091446 | 6/2020 |

* cited by examiner

FLUORESCENCE EMITTING ELEMENT, FLUORESCENCE EMITTING MODULE, AND LIGHT EMITTING DEVICE

TECHNICAL FIELD

The present invention relates to a fluorescence emitting element, a fluorescence emitting module, and light emitting device.

BACKGROUND ART

A conventional fluorescence emitting element that generates fluorescence by being excited by excitation light has been known. A fluorescence emitting element is applied to a light emitting device such as a projector, for example.

Patent Literature (PTL) 1 discloses a fluorescence generator as an example of a fluorescence emitting element. A light source device disclosed in PTL 1 includes a substrate for fluorescence formed of a plate-shaped glass member, a fluorescence generator (a fluorescence emitting element), a dichroic film located between the substrate for fluorescence and the fluorescence generator, and a light emitter that emits excitation light that excites the fluorescence generator.

CITATION LIST

Patent Literature

[PTL 1] Japanese Unexamined Patent Application Publication No. 2012-9242

SUMMARY OF INVENTION

Technical Problem

By the way, if the temperature of a fluorescence emitting element is increased by being irradiated with excitation light, a phenomenon in which less fluorescence is generated (a so-called thermal quenching phenomenon) occurs, which is known. For example, with the light source device disclosed in PTL 1, a thermal quenching phenomenon readily occurs due to insufficient heat dissipation of the fluorescence emitting element, and as a result, the fluorescence emitting element emits less fluorescence. Accordingly, efficiency of light usage achieved by the fluorescence emitting element disclosed in PTL 1 may be low.

In view of this, the present invention provides a fluorescence emitting element, a fluorescence emitting module, and a light emitting device that achieve high efficiency of light usage.

Solution to Problem

A fluorescence emitting element according to an aspect of the present invention includes: a wavelength conversion member that is plate-shaped and includes a fluorescent material, the wavelength conversion member including a first principal surface and a second principal surface that is on an opposite side from the first principal surface; and a metal film bonded to at least one surface out of the first principal surface and the second principal surface. In a plan view of the wavelength conversion member, the wavelength conversion member includes a region that does not overlap the metal film, and the metal film includes a bonding surface that is bonded to the at least one surface, and an exposed surface on an opposite side from the bonding surface.

A fluorescence emitting module according to an aspect of the present invention includes: the fluorescence emitting element stated above; and a light emitter that emits excitation light that excites the fluorescent material and enters the region through the first principal surface.

A light emitting device according to an aspect of the present invention includes the fluorescence emitting module stated above.

Advantageous Effects of Invention

According to the present invention, a fluorescence emitting element, a fluorescence emitting module, and a light emitting device that achieve high efficiency of light usage can be provided.

DESCRIPTION OF EMBODIMENTS

Figure 1A:
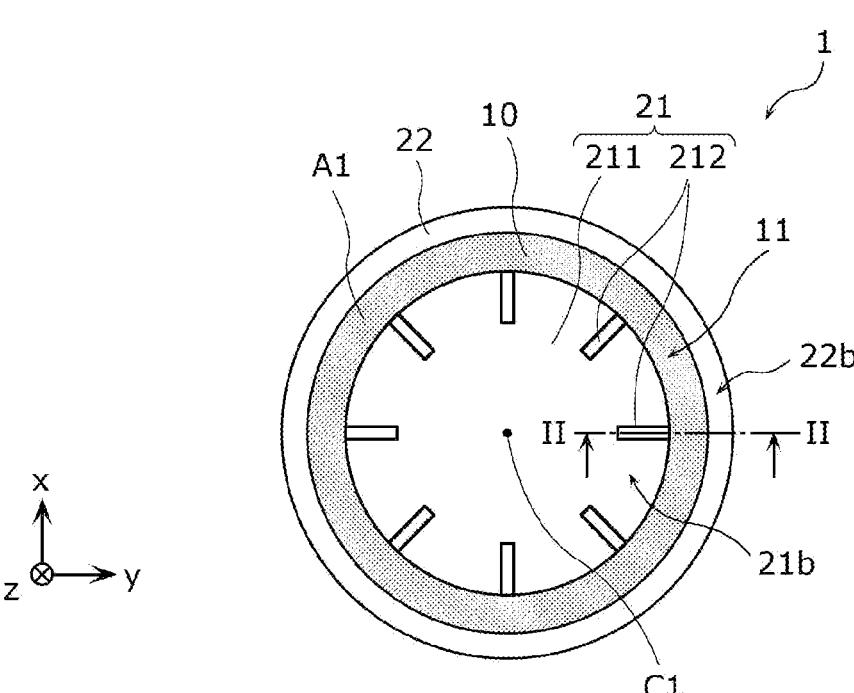
FIG. 1A is a plan view of fluorescence emitting element 1 according to an embodiment.

The following describes in detail a fluorescence emitting element, for instance, according to embodiments of the present invention, with reference to the drawings.

Note that the embodiments described below each show a general or specific example. The numerical values, shapes, materials, elements, the arrangement and connection of the elements, manufacturing processes, and the processing order of the manufacturing processes, for instance, described in the following embodiments are examples, and thus are not intended to limit the present invention.

In addition, the drawings are schematic diagrams, and do not necessarily provide strictly accurate illustration. Accordingly, scaling, for example, is not necessarily consistent throughout the drawings. In the drawings, the same sign is given to substantially the same configuration, and a redundant description thereof is omitted or simplified.

In the Specification, a term that indicates a relation between elements such as parallel or orthogonal, a term that indicates the shape of an element such as circular, and a numerical range do not necessarily have only strict meanings, and also cover substantially equivalent ranges that include a difference of about several percent, for example.

In the Specification and the drawings, the x axis, the y axis, and the z axis represent three axes of a three-dimensional orthogonal coordinate system. In the embodiments, two axes parallel to a first principal surface that a wavelength conversion member includes are referred to as an x axis and a y axis, and an axis orthogonal to the x axis and the y axis is referred to as a z axis.

Embodiment

[Configuration]

Figure 1B:
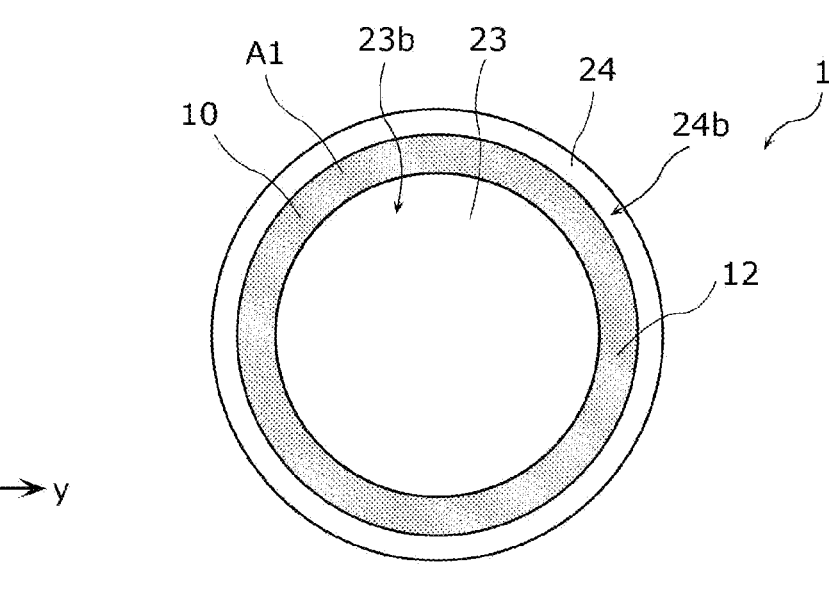
FIG. 1B is a bottom view of the fluorescence emitting element according to the embodiment.
Figure 2:
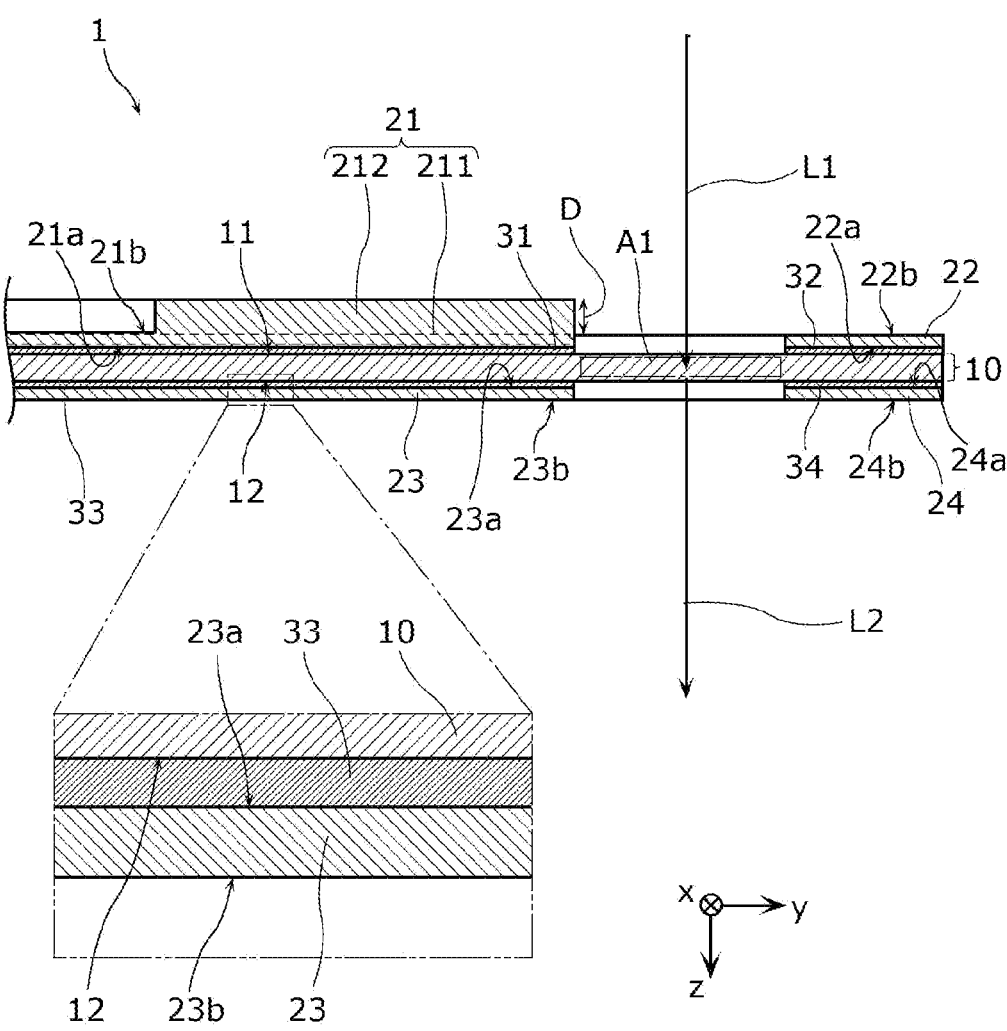
FIG. 2 includes cross sectional views each illustrating a cut surface of the fluorescence emitting element taken along line II-II in FIG. 1A.

First, a configuration of fluorescence emitting element 1 according to the present embodiment is to be described with reference to the drawings. FIG. 1A is a plan view of fluorescence emitting element 1 according to the present embodiment. FIG. 1B is a bottom view of fluorescence emitting element 1 according to the present embodiment. Note that a view of fluorescence emitting element 1 in the negative z-axis direction is a plan view, whereas a view of fluorescence emitting element 1 in the positive z-axis direction is a bottom view. The plan view is a view from the top, and the bottom view is a view from the underside. FIG. 2 includes cross sectional views each illustrating a cut surface of fluorescence emitting element 1 taken along line II-II in FIG. 1A. One of the cross sectional views in FIG. 2 is an enlarged view of a portion of the cross section of fluorescence emitting element 1 in a rectangular area defined by the two-dot chain line.

Fluorescence emitting element 1 is an optical member that receives excitation light L1 and emits transmitted light L2 that includes fluorescence. Fluorescence emitting element 1 is applied to a light emitting device typified by a projector and an illumination device. In the present embodiment, fluorescence emitting element 1 is applied to a projector, and is used as a fluorescent wheel in the projector. In this case, transmitted light L2 is used as projection light output by the projector.

As illustrated in FIG. 1A, FIG. 1B, and FIG. 2, fluorescence emitting element 1 includes wavelength conversion member 10, a plurality of metal films, and a plurality of nickel films. In the present embodiment, the plurality of metal films are first metal film 21, second metal film 22, third metal film 23, and fourth metal film 24, and the plurality of nickel films are first nickel film 31, second nickel film 32, third nickel film 33, and fourth nickel film 34.

First, wavelength conversion member 10 is to be described.

Wavelength conversion member 10 is a plate-shaped member that includes first principal surface 11 and second principal surface 12. More specifically, wavelength conversion member 10 is a circular substrate and thus has a circular plate shape. Wavelength conversion member 10 supports the plurality of metal films and the plurality of nickel films, as a support substrate. First principal surface 11 is one of the principal surfaces that wavelength conversion member 10 that is a substrate has, and second principal surface 12 is the other of the principal surfaces that wavelength conversion member 10 has. Second principal surface 12 is on the opposite side from first principal surface 11. Here, first principal surface 11 and second principal surface 12 are flat.

The diameter of wavelength conversion member 10 having a circular plate shape is preferably in a range from 30 mm to 90 mm, more preferably in a range from 35 mm to 70 mm, and yet more preferably in a range from 40 mm to 50 mm, but the diameter is not limited thereto. When fluorescence emitting element 1 is applied to a projector, the diameter of wavelength conversion member 10 is determined to allow wavelength conversion member 10 to fit in the casing of the projector.

The thickness of wavelength conversion member 10 (that is, the length thereof in the z-axis direction) may be in a range from 50 μm to 700 μm. The thickness of wavelength conversion member 10 is preferably in a range from 80 μm to 500 μm, and more preferably in a range from 100 μm to 300 μm. In the present embodiment, wavelength conversion member 10 has a thickness of 200 μm.

Wavelength conversion member 10 includes a fluorescent material. In the present embodiment, wavelength conversion member 10 is made of a fluorescent material that is a principle component. More specifically, wavelength conversion member 10 is a substrate that consists essentially of a sintered fluorescent substance made of a fluorescent material.

Note that here, a sintered fluorescent substance in this Specification is to be described.

A sintered fluorescent substance is a baked body obtained by baking raw-material powder of the above fluorescent material that is a principal component (an example of which is a granulated body obtained by granulating raw-material power of the fluorescent material) at a temperature lower than the melting point of the fluorescent material. During the baking process, raw-material powder particles of the sintered fluorescent substance are bonded. Accordingly, the sintered fluorescent substance requires almost no binder for bonding granulated bodies. More specifically, the sintered fluorescent substance does not need a binder at all. An example of a binder is a transparent resin in PTL 1 stated above. Further, a known material such as an $Al_2O_3$ material or a glass material (that is, $SiO_d$ ($0<d≤2$)) is used for the binder. Note that similarly, not just the binder, the sintered fluorescent substance needs almost no material (hereinafter, another material) other than the fluorescent material included in the sintered fluorescent substance, or more specifically, does not require none of such another material.

For example, when the entire volume of the sintered fluorescent substance is considered to be 100 vol %, the volume of the fluorescent material may occupy 70 vol % or more of the entire volume of the sintered fluorescent substance. Further, the volume of the fluorescent material occupies preferably 80 vol % or more, more preferably 90 vol % or more, or yet more preferably 95 vol % or more of the entire volume of the sintered fluorescent substance.

Note that stated differently, when the entire volume of the sintered fluorescent substance is considered to be 100 vol %, the volume of another material (for example, a binder) may occupy less than 30 vol % of the entire volume of the sintered fluorescent substance. Further, the volume of another material (for example, a binder) occupies preferably less than 20 vol %, more preferably less than 10 vol %, or yet more preferably less than 5 vol % of the entire volume of the sintered fluorescent substance.

If the volume percent of another material in the entire volume of the sintered fluorescent substance is high (or in other words, the proportion of the volume of another material is high), phonon scattering occurs due to a defect present at the interface between the fluorescent material and another material. As a result, thermal conductivity of the sintered fluorescent substance decreases. In particular, if the volume of another material occupies 30 vol % or more, thermal conductivity significantly decreases. Further, more non-radiative recombination occurs at the interface, and efficiency of light emission decreases. In other words, the lower the volume percent of another material (or in other words, the proportion of the volume of another material) in the entire volume of the sintered fluorescent substance is, the higher the thermal conductivity and efficiency of light emission become. The sintered fluorescent substance according to the present invention includes another material, the volume of which is less than 30 vol % in the entire volume of the sintered fluorescent substance.

Here, a fluorescent material is to be described.

The fluorescent material consists essentially of a crystalline phase having a garnet structure, for example. The garnet structure is a crystalline structure represented by the general formula $A_3B_2C_3O_{12}$. One or more rare earth elements such as Ca, Y, La, Ce, Pr, Nd, Sm, Eu, Gd, Tb, and Lu are used as element A, and one or more elements such as Mg, Al, Si, Ga, and Sc are used as element B, and one or more elements such as Al, Si, and Ga are used as element C. Examples of such a garnet structure include yttrium aluminum garnet (YAG), lutetium aluminum garnet (LuAG), lutetium calcium magnesium silicon garnet ($Lu_2CaMg_2Si_3O_{12}$), and terbium aluminum garnet (TAG). In the present embodiment, the fluorescent material consists essentially of the crystalline phase represented by $(Y_{1-x}Ce_x)_3Al_2Al_3O_{12}$ (that is, $(Y_{1-x}Ce_x)_3Al_5O_{12}$) ($0.0001 \leq x < 0.1$), stated differently, YAG.

When the fluorescent material consists essentially of YAG, there are cases where $Al_2O_3$ is used as the raw material. In this case, there are cases where $Al_2O_3$ remains as an unreacted raw material in the sintered fluorescent substance. However, $Al_2O_3$ that is an unreacted raw material is different from the binder described above.

If the entire volume of the sintered fluorescent substance is considered to be 100 vol %, the volume of $Al_2O_3$ that is an unreacted raw material in the entire volume of the sintered fluorescent substance is 5 vol % or less.

Note that the crystalline phase included in the fluorescent material may be a solid solution that includes a plurality of garnet crystalline phases having different chemical compositions. An example of such a solid solution is a solid solution $((1-a)(Y_{1-x}Ce_x)_3Al_5O_{12}\cdot a(Lu_{1-y}Ce_y)_3Al_2Al_3O_{12}$ ($0<a<1$)) that includes a garnet crystalline phase represented by $(Y_{1-x}Ce_x)_3Al_2Al_3O_{12}$ ($0.001 \leq x < 0.1$) and a garnet crystalline phase represented by $(Lu_{1-y}Ce_y)_3Al_2Al_3O_{12}$ ($0.001 \leq y < 0.1$). Further, an example of such a solid solution is a solid solution $((1-b)(Y_{1-x}Ce_x)_3Al_2Al_3O_{12}\cdot b(Lu_{1-z}Ce_z)_2CaMg_2Si_3O_{12}$ ($0<b<1$)) that includes a garnet crystalline phase represented by $(Y_{1-x}Ce_x)_3Al_2Al_3O_{12}$ ($0.00 \leq x < 0.1$) and a garnet crystalline phase represented by $(Lu_{1-z}Ce_z)_2CaMg_2Si_3O_{12}$ ($0.001 \leq z < 0.15$). The fluorescent material consists essentially of a solid solution that includes a plurality of garnet crystalline phases having different chemical compositions, and thus the spectrum of fluorescence emitted by the fluorescent material is further increased and includes more green light components and more red light components. Accordingly, a projector that emits projection light having a wide color gamut can be provided.

The crystalline phases included in the fluorescent material may include a crystalline phase having a chemical composition that deviates from the crystalline phase represented by the above-stated general formula $A_3B_2C_3O_{12}$. An example of such a crystalline phase is $(Y_{1-x}Ce_x)_3Al_{2+\delta}Al_3O_{12}$ (where $\delta$ is a positive number) that includes richer Al than the crystalline phase represented by $(Y_{1-x}Ce_x)_3Al_2Al_3O_{12}$ ($0.001 \leq x < 0.1$). Further, another example of such a crystalline phase is $(Y_{1-x}Ce_x)_{3+\zeta}Al_2Al_3O_{12}$ (where $\zeta$ is a positive number) that includes richer Y than the crystalline phase represented by $(Y_{1-x}Ce_x)_3Al_2Al_3O_{12}$ ($0.001 \leq x < 0.1$). Such crystalline phases have chemical compositions that deviate from the crystalline phase represented by the general formula $A_3B_2C_3O_{12}$, but maintain the garnet structure.

Furthermore, the crystalline phases included in the fluorescent material may include a different crystalline phase having a structure other than the garnet structure.

The fluorescent material that consists essentially of YAG receives, as excitation light L1, light entering through first principal surface 11 that wavelength conversion member 10 has (that is, from the negative z-axis side), and emits fluorescence. More specifically, the fluorescent material is irradiated with excitation light L1, and thus emits fluorescence as wavelength-converted light. Hence, the wavelength-converted light emitted from the fluorescent material has a wavelength longer than the wavelength of excitation light L1.

As an example, excitation light L1 has a peak wavelength in a range from 380 nm to 490 nm and is in a range from near-ultraviolet light to blue light. At this time, excitation light L1 has a peak wavelength of 455 nm, for example, and is blue light.

In the present embodiment, wavelength-converted light emitted from the fluorescent material includes fluorescence that is yellow light. For example, the fluorescent material absorbs light having a wavelength in a range from 380 nm to 490 nm, and emits fluorescence that is yellow light and has a peak wavelength in a range from 490 nm to 580 nm. Since the fluorescent material consists essentially of YAG, the fluorescent material can readily emit fluorescence having a peak wavelength in a range from 490 nm to 580 nm.

In the present embodiment, as illustrated in FIG. 2, the wavelength of a portion of excitation light L1 that has entered is converted by the fluorescent material, and the portion of excitation light L1 passes through fluorescence emitting element 1 and exits through second principal surface 12. Further, the wavelength of another portion of excitation light L1 that has entered is not converted by the fluorescent material, and the other portion of excitation light L1 passes through fluorescence emitting element 1 and exits through second principal surface 12. Transmitted light L2 passing through wavelength conversion member 10 includes fluorescence that is yellow light having a converted wavelength and excitation light L1 that is blue light having a wavelength not converted. Thus, transmitted light L2 is a combination of such light, and is while light.

Next, region A1 where such excitation light L1 enters is to be described.

Wavelength conversion member 10 has region A1 that does not overlap the plurality of metal films in a plan view. Note that region A1 does not overlap the plurality of metal films also in a bottom view. In FIG. 1A and FIG. 1B, region A1 is shown with dots, and in FIG. 2, region A1 corresponds to a rectangular region surrounded by the dash-dot line.

Furthermore, as illustrated in FIG. 1A, in the plan view of wavelength conversion member 10, the shape of region A1 is an annular ring, and the center of the annular ring overlaps center point C1 of wavelength conversion member 10. Region A1 is provided in a circular ring shape on a circumference equally distant from center point C1 of wavelength conversion member 10. Thus, region A1 is provided in a belt shape along the circumferential direction in the plan view.

As illustrated in FIG. 1A, FIG. 1B, and FIG. 2, wavelength conversion member 10 does not need to be supported by another element. Thus, wavelength conversion member 10 has a rigid property. Since wavelength conversion member 10 includes a sintered fluorescent substance and has a thickness in the above range, wavelength conversion member 10 has a rigid property. As compared with the fluorescence generator formed with a coating material that includes a fluorescent substance and a transparent resin, which is disclosed in PTL 1, wavelength conversion member 10 according to the present embodiment is much more rigid and thus has a property of being less deformed by an external force applied when wavelength conversion member 10 is rotated.

Next, the plurality of metal films are to be described.

As stated above, fluorescence emitting element 1 includes first metal film 21, second metal film 22, third metal film 23, and fourth metal film 24 as the plurality of metal films. First metal film 21 includes main body 211 and a plurality of radiator fins 212. First metal film 21, second metal film 22, third metal film 23, and fourth metal film 24 are elements each consisting essentially of a metal material.

When fluorescence emitting element 1 includes a single metal film, the single metal film is a member bonded to at least one surface out of first principal surface 11 and second principal surface 12 that wavelength conversion member 10 includes. In the present embodiment, fluorescence emitting element 1 includes a plurality of metal films, and the plurality of metal films are provided on both first principal surface 11 and second principal surface 12. First metal film 21 and second metal film 22 are bonded to first principal surface 11 located on the negative z-axis side. Third metal film 23 and fourth metal film 24 are bonded to second principal surface 12 located on the positive z-axis side. In the plan and bottom views of wavelength conversion member 10, the plurality of metal films are provided on the inner and outer sides of the annular ring shape that is the shape of region A1. In the following, the metal films provided on the inner side are referred to as "inner metal films", and first metal film 21 and third metal film 23 are referred to as the "inner metal films". Furthermore, the metal films provided on the outer side are referred to as "outer metal films", and second metal film 22 and fourth metal film 24 are referred to as the "outer metal films".

Main body 211 that first metal film 21 includes, second metal film 22, third metal film 23, and fourth metal film 24 are thin films stacked over wavelength conversion member 10. The thicknesses (the lengths in the z-axis direction) of main body 211, second metal film 22, third metal film 23, and fourth metal film 24 may each be in a range from 10 μm to 1200 μm. The thicknesses are preferably in a range from 30 μm to 500 μm, and more preferably in a range from 50 μm 200 μm. Note that in the present embodiment, the thicknesses of main body 211, second metal film 22, third metal film 23, and fourth metal film 24 are the same in the present embodiment, but may not be the same.

In the plan view, main body 211 has a circular shape, and the center of the circular shape overlaps center point C1 of wavelength conversion member 10. In the plan view, second metal film 22 has an annular ring shape, and the center of the annular ring shape overlaps center point C1 of wavelength conversion member 10. In the plan view, the outer circumference of the annular ring shape of second metal film 22 overlaps the outer circumference of the circular shape of wavelength conversion member 10.

Similarly, in the bottom view, third metal film 23 has a circular shape, and the center of the circular shape overlaps center point C1 of wavelength conversion member 10. In the bottom view, fourth metal film 24 has an annular ring shape, and the center of the annular ring shape overlaps center point C1 of wavelength conversion member 10. In the bottom view, the outer circumference of the annular ring shape of fourth metal film 24 overlaps the outer circumference of the circular shape of wavelength conversion member 10.

With such a configuration, it can be said that region A1 is located between the inner and outer metal films in the plan and bottom views.

For example, when fluorescence emitting element 1 includes a single metal film, the single metal film includes a bonding surface that is bonded to at least one of first principal surface 11 or second principal surface 12, and an exposed surface on the opposite side from the bonding surface. In the present embodiment, the plurality of metal films each include a bonding surface that is bonded to a principal surface that wavelength conversion member 10 has and an exposed surface on the opposite side from the bonding surface.

As illustrated in FIG. 2, first metal film 21 includes bonding surface 21a and exposed surface 21b. Similarly, second metal film 22 includes bonding surface 22a and exposed surface 22b, third metal film 23 includes bonding surface 23a and exposed surface 23b, and fourth metal film 24 includes bonding surface 24a and exposed surface 24b. Two bonding surfaces 21a and 22a are bonded to first principal surface 11. Two bonding surfaces 23a and 24a are bonded to second principal surface 12. Four exposed surfaces 21b, 22b, 23b, and 24b are exposed to the atmosphere around fluorescence emitting element 1. In other words, four exposed surfaces 21b, 22b, 23b, and 24b are exposed to the external environment, being on the opposite side from bonding surfaces 21a, 22a, 23a, and 24a, respectively.

Note that the plurality of nickel films are provided between wavelength conversion member 10 and the plurality of metal films. As an example, bonding surface 21a of first metal film 21 is bonded to first principal surface 11 with first nickel film 31 being provided therebetween. Similarly, bonding surface 22a of second metal film 22 is bonded to first principal surface 11 with second nickel film 32 being provided therebetween, bonding surface 23a of third metal film 23 is bonded to second principal surface 12 with third nickel film 33 being provided therebetween, and bonding surface 24a of fourth metal film 24 is bonded to second principal surface 12 with fourth nickel film 34 being provided therebetween.

In the present embodiment, first principal surface 11 and second principal surface 12 of wavelength conversion member 10 and bonding surfaces 21a, 22a, 23a, and 24a of the plurality of metal films are bonded to one another. Accordingly, even if heat is generated in wavelength conversion member 10 due to being irradiated with excitation light L1, the heat is readily transferred from wavelength conversion member 10 to the plurality of metal films. In general, the metal material of the plurality of metal films has higher thermal conductivity than those of fluorescent materials such as YAG. Accordingly, the heat is readily transferred inside the plurality of metal films. Furthermore, since the plurality of metal films include exposed surfaces 21b, 22b, 23b, and 24b that are exposed to the atmosphere, the heat is readily dissipated from exposed surfaces 21b, 22b, 23b, and 24b. Thus, the above configuration of fluorescence emitting element 1 can enhance heat dissipation of fluorescence emitting element 1.

Here, advantageous effects yielded by fluorescence emitting element 1 according to the present embodiment are to be described.

As described above, if a thermal quenching phenomenon occurs in a conventional fluorescence emitting element, efficiency of light usage decreases. However, in the present embodiment, since heat dissipation of fluorescence emitting element 1 can be enhanced, a rise in temperature of wavelength conversion member 10 due to being irradiated with excitation light L1 can be reduced. Accordingly, a thermal quenching phenomenon does not readily occur, and thus a decrease in fluorescence can be reduced. Hence, fluorescence emitting element 1 that achieves high efficiency of light usage can be produced.

In the present embodiment, region A1 is located between the inner and outer metal films. At this time, heat generated in region A1 by being irradiated with excitation light L1 can be transferred to both of two metal films between which region A1 is located. In this case, for example, as compared with the case in which fluorescence emitting element 1 includes metal films on only one of the inner side or the outer side of region A1, heat dissipation of wavelength conversion member 10 can be enhanced. Accordingly, a rise in temperature of wavelength conversion member 10 can be reduced, and thus a decrease in fluorescence can be reduced.

Furthermore, radiator fins 212 are to be described. In the present embodiment, first metal film 21 that is an inner metal film provided on first principal surface 11 includes radiator fins 212.

Radiator fins 212 are projections that protrude in a direction opposite the direction extending from main body 211 to wavelength conversion member 10. Thus, radiator fins 212 are regions in contact with main body 211 and protrude in the negative z-axis direction. Further, FIG. 2 illustrates thickness D of radiator fins 212 in the thickness direction (the z-axis direction) of wavelength conversion member 10. Note that radiator fins 212 have same thickness D, but may have different thicknesses.

As illustrated in FIG. 1A, here, eight radiator fins 212 are provided. In the plan view, eight radiator fins 212 radially extend. More specifically, eight radiator fins 212 extend radially about center point C1 of wavelength conversion member 10. As illustrated in FIG. 1A, eight radiator fins 212 extend radially about center point C1, spreading at equal intervals.

For example, when n radiator fins 212 are provided, "spreading at equal intervals" means that an angle formed by the direction in which one radiator fin 212 extends and the direction in which another radiator fin 212 that is adjacent to one radiator fin 212 extends is an angle obtained by dividing 360 degrees by n. In the present embodiment, out of eight radiator fins 212, an angle formed by the direction in which one radiator fin 212 extends and the direction in which another radiator fin 212 adjacent to one radiator fin 212 extends is 45 degrees.

Note that here, eight radiator fins 212 are provided, yet the present embodiment is not limited thereto and it is sufficient if at least one radiator fin 212 is provided. Plural radiator fins 212 may be disposed in a matrix shape or an annular ring shape about center point C1, for example. From the view point of load applied onto a rotator (described in detail later) that is a motor and long-term reliability, the center of gravity of fluorescence emitting element 1 desirably coincides with center point C1 (described in detail later) of wavelength conversion member 10. Accordingly, here, as a structure in which the center of gravity readily coincides with center point C1, a structure in which radiator fins 212 spread at equal intervals is presented. However, as long as the center of gravity and center point C1 coincide with each other, plural radiator fins 212 do not need to spread at equal intervals.

Since first metal film 21 that is one of the metal films includes plural radiator fins 212, the surface area of first metal film 21 increases. An increase in the surface area allows heat to be more readily dissipated from first metal film 21, and thus can further enhance heat dissipation of fluorescence emitting element 1.

Furthermore, the plurality of metal films consist essentially of copper (Cu). Cu is a metal material having high thermal conductivity, which is 395 W/m·K. The thermal conductivity of YAG included in the fluorescent material is 11.2 W/m·K. Accordingly, heat dissipation of wavelength conversion member 10 can be further enhanced by making the plurality of metal films using Cu.

Note that the plurality of metal films may consist essentially of a material other than Cu, and may consist essentially of one or more metal elements selected from among Ni, Pd, Rh, Mo, and W or an alloy that includes one or more of the metal elements, for example. The elements have thermal conductivity as follows: thermal conductivity of Ni is 83 W/m·K, thermal conductivity of Pd is 73 W/m·K, thermal conductivity of Rh is 150 W/m·K, thermal conductivity of Mo is 135 W/m·K, and thermal conductivity of W is 163 W/m·K. Accordingly, heat dissipation of wavelength conversion member 10 can be further enhanced by making the plurality of metal films using such a metal material.

Next, the plurality of nickel films are to be described.

The plurality of nickel films are provided between wavelength conversion member 10 and the plurality of metal films. The plurality of nickel films consist essentially of Ni.

The thicknesses (the lengths in the z-axis direction) of the plurality of nickel films may each be in a range from 0.1 μm to 100 μm. The thicknesses are preferably in a range from 0.5 μm to 50 μm, and more preferably in a range from 1 μm to 5 μm.

The plurality of nickel films exhibit high adhesion to both of wavelength conversion member 10 and the plurality of metal films. Thus, as compared with the case in which the plurality of nickel films are not provided, detachment of the plurality of metal films can be prevented. If the plurality of metal films are detached, heat dissipation of fluorescence emitting element 1 deteriorates. Since a plurality of nickel films are provided, Cu included in the plurality of metal films can be prevented from being diffused into wavelength conversion member 10. Thus, the plurality of nickel films can be used as barrier films for preventing diffusion of Cu. Further, Ni has high thermal conductivity as described above. Hence, even when the plurality of nickel films are provided between wavelength conversion member 10 and the plurality of metal films, it is less likely to prevent transfer of heat from wavelength conversion member 10 to the plurality of metal films.

In the plan view, the shape of each of the plurality of nickel films is desirably the same as the shape of one of the plurality of metal films in contact with the nickel film. The shape of first nickel film 31 is a circular shape in the plan view, which is the same as the shape of main body 211 that first metal film 21 includes, and the center of the circular shape overlaps center point C1 of wavelength conversion member 10. The shape of second nickel film 32 is an annular ring shape in the plan view, which is the same as the shape of second metal film 22, and the center of the annular ring shape overlaps center point C1 of wavelength conversion member 10. The shape of third nickel film 33 is a circular shape in the plan view, which is the same as the shape of third metal film 23, and the center of the circular shape overlaps center point C1 of wavelength conversion member 10. The shape of fourth nickel film 34 is an annular ring shape in the plan view, which is the same as the shape of fourth metal film 24, and the center of the annular ring shape overlaps center point C1 of wavelength conversion member 10.

Since the plurality of nickel films have the shapes as stated above, the plurality of metal films are always bonded to wavelength conversion member 10 with the plurality of nickel films being provided therebetween. Thus, the plurality of metal films and wavelength conversion member 10 are not in direct contact, and thus detachment of the plurality of metal films and diffusion of Cu can be readily prevented.

[Configuration of Projector]

Figure 3:
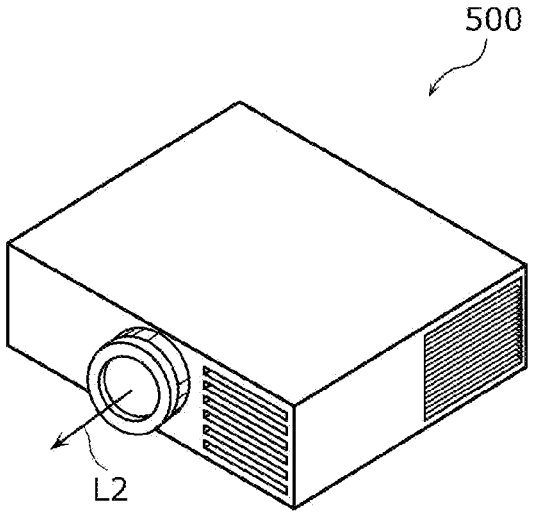
FIG. 3 is a perspective view illustrating an appearance of a projector according to the embodiment.
Figure 4A:
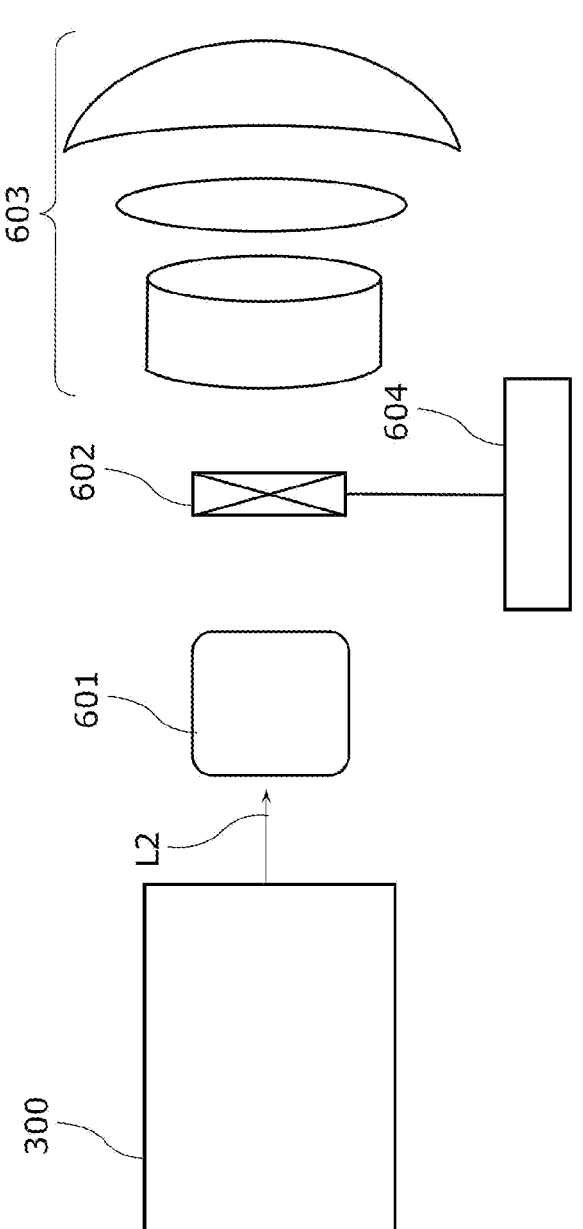
FIG. 4A is a schematic diagram illustrating a configuration of the projector according to the embodiment.
Figure 4B:
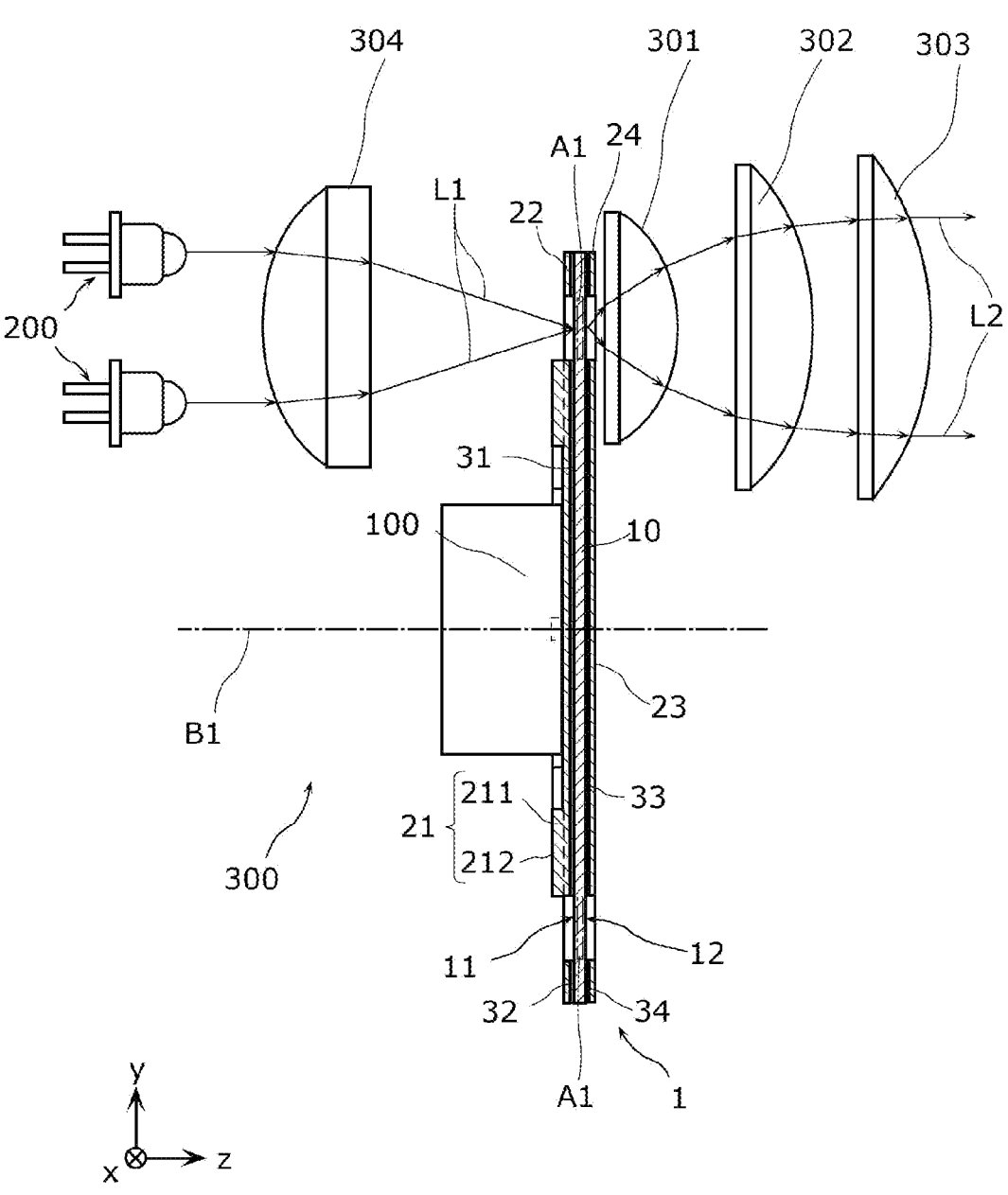
FIG. 4B is a schematic diagram illustrating a fluorescence emitting module according to the embodiment.
Figure 5:
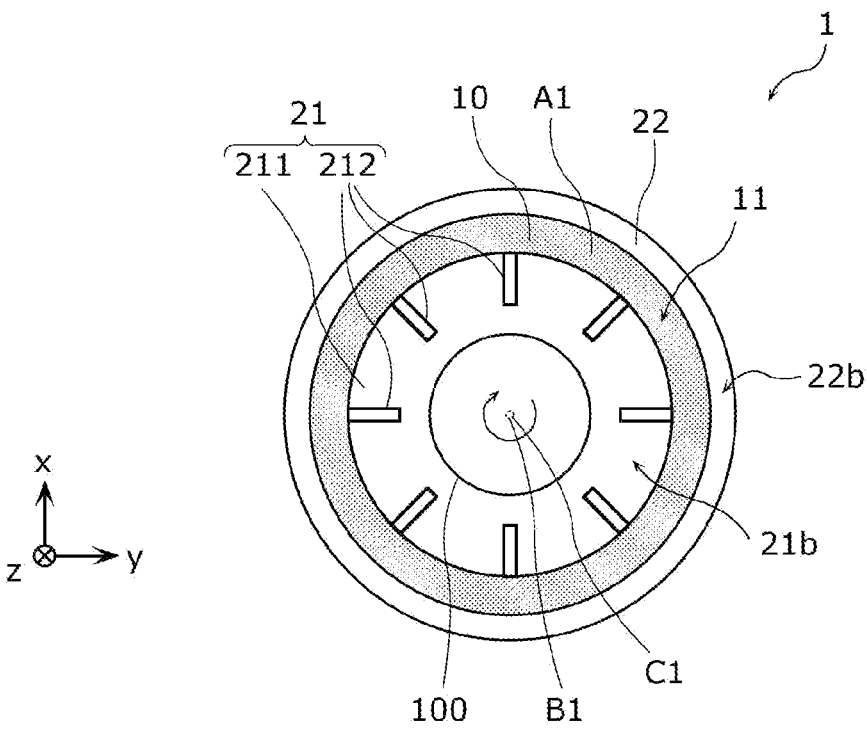
FIG. 5 is a plan view illustrating a positional relationship between the fluorescence emitting element and a rotator, according to the embodiment.

Fluorescence emitting element 1 having a configuration as described above is used in projector 500 illustrated in FIG. 3. FIG. 3 is a perspective view illustrating an appearance of projector 500 according to the present embodiment. FIG. 4A is a schematic diagram illustrating a configuration of projector 500 according to the present embodiment. FIG. 4B is a schematic diagram illustrating fluorescence emitting module 300 according to the present embodiment. FIG. 5 is a plan view illustrating a positional relationship between fluorescence emitting element 1 and rotator 100 according to the present embodiment. In the following, a configuration of projector 500 according to the present embodiment is to be described with reference to FIG. 4A, FIG. 4B, and FIG. 5. Note that FIG. 4B illustrates fluorescence emitting element 1 in a cross section, similarly to FIG. 2.

As illustrated in FIG. 4A, projector 500 according to the present embodiment includes fluorescence emitting module 300. Similarly to a known projector, projector 500 includes homogeneous optical system 601, display element 602, light transmitter 603, and control circuit 604 that controls display element 602. Homogeneous optical system 601 includes two multi-lens arrays (MLAs). Display element 602 is a substantially flat element that controls and outputs, as a video, transmitted light L2 output from fluorescence emitting module 300 and passing through homogeneous optical system 601. In other words, display element 602 generates light for a video. Display element 602 is specifically a transmissive liquid crystal panel. Display element 602 separates transmitted light L2 into red light, green light, and blue light. After that, red light, green light, and blue light that are separated are optically modulated by portions of display element 602 for the red, green, and blue light. As a result, a video is generated, and wavelengths of the red light, the green light, and the blue light are combined by a cross prism (not illustrated) that is an RGB combiner. Light transmitter 603 is of a Tessar type. Transmitted light L2 output from fluorescence emitting module 300 is controlled by the elements in the order of homogeneous optical system 601, display element 602, and light transmitter 603, and becomes projection light that is to be enlarged and projected onto a screen, for example. Control circuit 604 controls display element 602, and is implemented by a microcomputer, for example, but may be implemented by a processor. Note that the configuration of projector 500 is not limited to this configuration, and homogeneous optical system 601 may be a kaleidoscope structure such as a light pipe. Homogeneous optical system 601 may not be provided in a projector and a light emitting device that do not need evenness of a projected image. Display element 602 may be a digital micromirror device (DMD) or a liquid crystal on silicon (LCOS). For example, display element 602 may be a reflective liquid crystal panel, or may be a digital light processing (DLP) panel that includes a digital micromirror device (DMD). Transmitted light L2 may not be separated into red light, green light, and blue light in a projector and a light emitting device that adopt a time-division method and a black-and-white method. Light transmitter 603 may be of another type, such as a Gauss type.

As illustrated in FIG. 4B, fluorescence emitting module 300 includes fluorescence emitting element 1 and two light emitters 200. Note that fluorescence emitting module 300 may include single light emitter 200. Fluorescence emitting module 300 includes rotator 100, first optical element 301, second optical element 302, third optical element 303, and fourth optical element 304.

Two light emitters 200 are light sources that each emit excitation light L1. Excitation light L1 excites the fluorescent material included in wavelength conversion member 10. Two light emitters 200 are, for example, semiconductor laser light sources or light emitting diode (LED) light sources, and each emit excitation light L1 having a predetermined color (wavelength) by being driven by a driving current.

In the present embodiment, two light emitters 200 are semiconductor laser light sources. Note that semiconductor laser elements included in two light emitters 200 are GaN-based semiconductor laser elements (laser chips) consisting essentially of a nitride semiconductor material, for example. In the present embodiment, two light emitters 200 that are semiconductor laser light sources are collimator lens integrated light emitting devices of a TO-CAN type. Note that two light emitters 200 may be multi-chip lasers as disclosed in Japanese Unexamined Patent Application Publication No. 2016-219779 that is a patent literature or may each include a collimator lens and a TO-CAN separately.

As described above, two light emitters 200 each emit, as excitation light L1, a laser beam in a range from near ultra violet light to blue light, which has a peak wavelength in a range from 380 nm to 490 nm. At this time, excitation light L1 has a peak wavelength of 445 nm, for example, and is blue light.

Rotator 100 is a member that rotates fluorescence emitting element 1 about axis B1 that extends in the thickness direction (z-axis direction) of fluorescence emitting element 1, and is a motor as an example. As an example, as shown by the arrow in FIG. 5, rotator 100 rotates fluorescence emitting element 1 about axis B1 clockwise in the plan view. Axis B1 passes through center point C1 that is a center of fluorescence emitting element 1, and thus penetrates fluorescence emitting element 1. Further, rotator 100 includes a rotation shaft having a center along axis B1. Note that as illustrated in FIG. 5, fluorescence emitting element 1 is provided at a position that overlaps such rotator 100 in the plan view.

First optical element 301, second optical element 302, and third optical element 303 are optical members that control optical paths of transmitted light L2 output from fluorescence emitting element 1. As an example, first optical element 301, second optical element 302, and third optical element 303 are lenses that collect transmitted light L2. As illustrated in FIG. 4B, first optical element 301, second optical element 302, and third optical element 303 are disposed closer to second principal surface 12 of wavelength conversion member 10 than to first principal surface 11. If the size of projector 500 needs to be decreased, the distances from fluorescence emitting element 1 to first optical element 301, second optical element 302, and third optical element 303 need to be shortened.

Fourth optical element 304 is an optical member that controls optical paths of excitation light L1 output from two light emitters 200. As an example, fourth optical element 304 is a lens for collecting excitation light L1. As illustrated in FIG. 4B, fourth optical element 304 is disposed closer to first principal surface 11 of wavelength conversion member 10 than to second principal surface 12.

Next, behavior of light in FIG. 4B is to be described.

Excitation light L1 emitted by two light emitters 200 enters region A1 included in wavelength conversion member 10 of fluorescence emitting element 1. A wavelength of a portion of excitation light L1 that has entered is converted by the fluorescent material included in region A1, and the portion of excitation light L1 passes through wavelength conversion member 10 in the form of fluorescence. A wavelength of another portion of excitation light L1 that has entered is not converted by the fluorescent material included in region A1, and the other portion of excitation light L1 passes through wavelength conversion member 10. Transmitted light L2 passing through wavelength conversion member 10 is combined light that includes fluorescence that is yellow light and excitation light L1 that is blue light having a wavelength not converted, and is white light. Furthermore, transmitted light L2 is emitted from fluorescence emitting element 1, to have a substantially Lambertian light distribution. Thus, in the present embodiment, fluorescence emitting element 1 is used as a light-transmissive fluorescent wheel, as illustrated in FIG. 4B.

As described above, since the shape of region A1 is an annular ring shape, when fluorescence emitting element 1 is rotated by rotator 100, excitation light L1 readily enters region A1. Accordingly, fluorescence emitting element 1 can be more readily used as a fluorescent wheel.

Transmitted light L2 emitted from fluorescence emitting element 1 is substantially collimated by first optical element 301, second optical element 302, and third optical element 303, and exits therethrough. Note that first optical element 301, second optical element 302, and third optical element 303 may not collect transmitted light L2 emitted from fluorescence emitting element 1. For example, first optical element 301, second optical element 302, and third optical element 303 may collect emitted transmitted light L2 or cause emitted transmitted light L2 to slightly spread out. An angle of radiation of transmitted light L2 exiting through first optical element 301, second optical element 302, and third optical element 303 may be an angle of radiation at which light efficiently travels in projector 500 and an illumination device in each of which fluorescence emitting element 1 is used.

Transmitted light L2 that has exited travels toward homogeneous optical system 601 illustrated in FIG. 4A. As described above, transmitted light L2 output from fluorescence emitting module 300 is controlled by the elements in the order of homogeneous optical system 601, display element 602, and light transmitter 603, and becomes projection light that is to be enlarged and projected onto a screen. Thus, transmitted light L2 is used as projection light output by projector 500. Note that an optical element not illustrated, for instance, is provided between third optical element 303 and homogeneous optical system 601, and the optical paths of transmitted light L2 may be controlled by the optical element.

In the present embodiment, fluorescence emitting module 300 includes fluorescence emitting element 1 that achieves high efficiency of light usage. Thus, fluorescence emitting module 300 that achieves high efficiency of light usage can be produced. Fluorescence emitting module 300 includes two light emitters 200 that each emit excitation light L1 that is to enter region A1. Region A1 is a region of wavelength conversion member 10, which does not overlap the plurality of metal films. Thus, loss of light caused by, for instance, excitation light L1 being reflected by the plurality of metal films is less likely to occur. Accordingly, excitation light L1 readily enters wavelength conversion member 10, and generates fluorescence that is light having a converted wavelength.

As described above, transmitted light L2 is emitted from fluorescence emitting element 1, to have a substantially Lambertian light distribution. Accordingly, first optical element 301 needs to be disposed in the vicinity of fluorescence emitting element 1, to efficiently use and control transmitted light L2 emitted from fluorescence emitting element 1. Specifically, the distance between second principal surface 12 and an entrance surface of first optical element 301 may be smaller than the thickness of first optical element 301. More specifically, the distance between second principal surface 12 and the entrance surface of first optical element 301 is preferably 2 mm or less, more preferably 1.5 mm or less, or yet more preferably 1.0 mm or less.

To decrease the size of projector 500, there are cases where the distance between fluorescence emitting element 1 and first optical element 301 and the distance between second optical element 302 and third optical element 303 need to be further shortened. In such cases, since radiator fins 212 that first metal film 21 includes are provided closer to first principal surface 11 than to second principal surface 12, first optical element 301 can be prevented from being in contact with radiator fins 212 so that damage can be prevented from being caused.

As described above, it is necessary to dispose first optical element 301 in the vicinity of fluorescence emitting element 1 in order to efficiently control transmitted light L2 emitted from fluorescence emitting element 1 to have a substantially Lambertian light distribution. On the other hand, it is sufficient if fourth optical element 304 can collect excitation light L1 on fluorescence emitting element 1, and thus the distance between first principal surface 11 and the exit surface of fourth optical element 304 can be made longer than the distance between second principal surface 12 and the entrance surface of first optical element 301. For example, at this time, the spot size of excitation light L1 on fluorescence emitting element 1 is smaller than the spot size of transmitted light L2 on fluorescence emitting element 1. Thus, if plural radiator fins 212 are formed on third metal film 23 and fourth metal film 24, the height of plural radiator fins 212 need to be shorter than the height of plural radiator fins 212 formed on first metal film 21 (or more specifically, main body 211). Further, plural radiator fins 212 may be formed on second metal film 22. The height of plural radiator fins 212 formed on second metal film 22 may be the same as the height of plural radiator fins 212 formed on first metal film 21. However, as described above, the case in which plural radiator fins 212 are formed on the first metal film yields better cooling effects, as will be described later. If radiator fins 212 are formed on second metal film 22 and fourth metal film 24, radiator fins 212 are located on a further outer circumferential portion of fluorescence emitting element 1. In this case, as compared with the case in which radiator fins 212 are formed on first metal film 21 and third metal film 23, a heavier load is applied onto rotator 100 that is a motor. Thus, if radiator fins 212 are formed on each of first metal film 21, second metal film 22, third metal film 23, and fourth metal film 24, the heights of radiator fins 212 are preferably as follows. Thus, the height of radiator fins 212 on fourth metal film 24 may be the shortest, the height of radiator fins 212 on third metal film 23 may be the second shortest, the height of radiator fins 212 on second metal film 22 may be the second highest, and the height of radiator fins 212 on first metal film 21 may be the highest.

In the present embodiment, projector 500 that is an example of a light emitting device includes fluorescence emitting module 300 that achieves high efficiency of light usage. Accordingly, projector 500 can be produced as a light emitting device that achieves high efficiency of light usage.

[Relation Between Predetermined Parameter and Temperature of Wavelength Conversion Member]

The following is to describe relations between the temperature of wavelength conversion member 10 and four predetermined parameters of fluorescence emitting element 1.

The four predetermined parameters are thicknesses of the metal films, positions at which radiator fins 212 are provided, thickness D of radiator fins 212, and the count of radiator fins 212. The four predetermined parameters are to be described using first to fourth examples. Here, using thermal simulations, the temperature of wavelength conversion member 10 is calculated when wavelength conversion member 10 is irradiated with excitation light L1. Note that in the first to fourth examples, fluorescence emitting elements in all the three cases described below are stated as fluorescence emitting element 1 for convenience. The three cases are "the case in which a fluorescence emitting element does not include metal films", "the case in which a metal film included in a fluorescence emitting element does not include radiator fins", and "the case in which some of radiator fins included in metals films that a fluorescence emitting element includes are provided on an outer metal film".

First Example

First, the case in which the predetermined parameter indicates thicknesses of the metal films is to be described. More specifically, the thicknesses of the metal films mean the thickness of main body 211, the thickness of second metal film 22, the thickness of third metal film 23, and the thickness of fourth metal film 24 in the z-axis direction.

Here, thermal simulations are conducted under three conditions that the thickness of wavelength conversion member 10 is 100 μm, 200 μm, and 550 μm.

Figure 6:
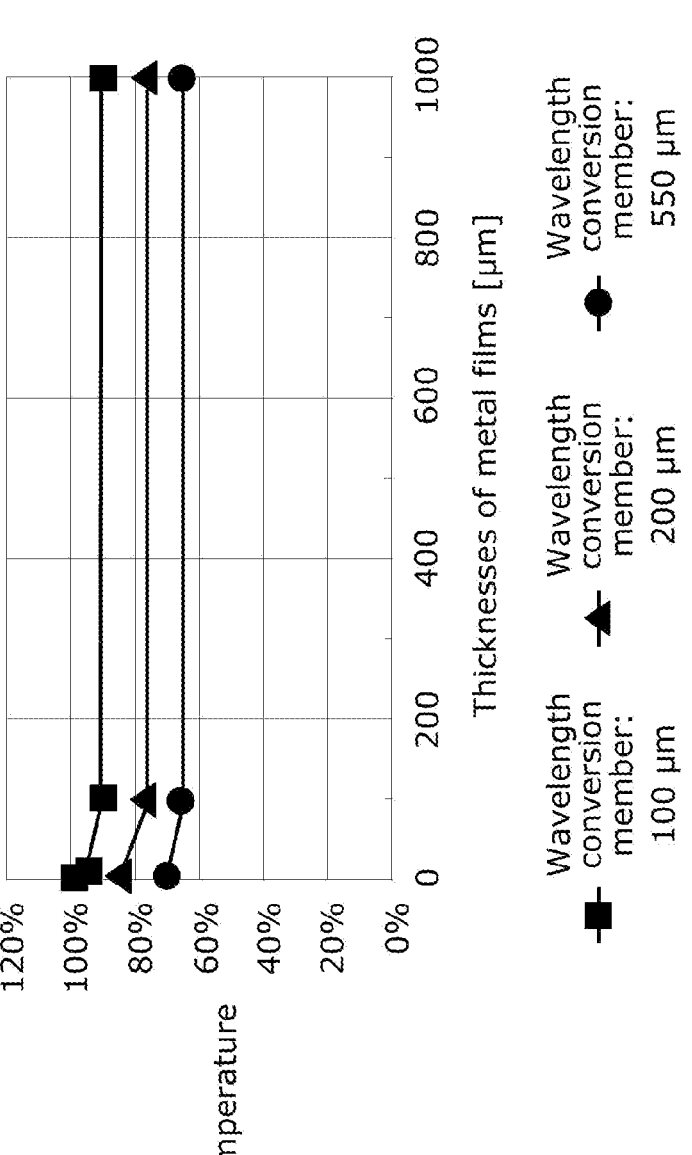
FIG. 6 illustrates a relation between a temperature of a wavelength conversion member and thicknesses of metal films, according to the embodiment.

FIG. 6 illustrates a relation between a temperature of wavelength conversion member 10 and the thicknesses of the metal films, according to the present embodiment. More specifically, FIG. 6 illustrates a graph showing a relation between a temperature when region A1 that wavelength conversion member 10 includes is irradiated with excitation light L1 (hereinafter, a temperature of wavelength conversion member 10) and thicknesses of the plurality of metal films. Note that in the graph illustrated in FIG. 6, the vertical axis shows a temperature of wavelength conversion member 10, whereas the horizontal axis shows thicknesses of the metal films. The left end of the graph, that is, when thicknesses of the metal films are 0 μm shows the case in which fluorescence emitting element 1 does not include the metal films. Further, an example in which the thickness of wavelength conversion member 10 is 100 μm is shown by squares, an example in which the thickness of wavelength conversion member 10 is 200 μm is shown by triangles, and an example in which the thickness of wavelength conversion member 10 is 550 μm is shown by circles.

The vertical axis of the graph illustrated in FIG. 6 shows normalized values on the assumption that 100% indicates a temperature (degrees Celsius) in the case where "fluorescence emitting element 1 does not include metal films and the thickness of wavelength conversion member 10 is 100 μm" and 0% indicates 0 degrees Celsius.

In all the examples of the thicknesses of wavelength conversion member 10, if the thicknesses of the metal films increase from 0 μm to 100 μm, the temperature of wavelength conversion member 10 suddenly decreases. Similarly, if the thicknesses of the metal films increase from 100 μm to 1000 μm, the temperature of wavelength conversion member 10 slightly decreases.

Thus, this shows that the greater the thicknesses of the metal films are, the more heat dissipation of fluorescence emitting element 1 can be enhanced. As an example, the thicknesses of the metal films may be 100 μm or more in order that fluorescence emitting element 1 sufficiently dissipates heat. On the other hand, the greater the thicknesses of the metal films are, the greater the weight of fluorescence emitting element 1 is. Accordingly, when fluorescence emitting element 1 is rotated by, for instance, rotator 100 described above, a problem arises that more energy is necessary. Thus, the thicknesses of the metal films are preferably in a range from 10 μm to 1200 μm, more preferably in a range from 30 μm to 500 μm, or yet more preferably in a range from 50 μm to 200 μm.

The graph illustrated in FIG. 6 shows that the greater the thickness of wavelength conversion member 10 is, the lower the temperature of wavelength conversion member 10 is, so that heat dissipation of wavelength conversion member 10 can be enhanced. However, the greater the thickness of wavelength conversion member 10 is, the heavier the weight of fluorescence emitting element 1 is. Accordingly, similarly to the case in which the thicknesses of the metal films are great, when fluorescence emitting element 1 is rotated by, for instance, rotator 100, a problem arises that still more energy is necessary. Furthermore, the greater the thickness of wavelength conversion member 10 is, the more readily excitation light L1 is scattered. As a result, the light emission spot diameter of transmitted light L2 on wavelength conversion member 10 in the bottom view increases. As a result, the sizes of optical elements such as lenses (first optical element 301, second optical element 302, and third optical element 303) disposed on the optical paths of transmitted light L2 enormously increase in projector 500, for example, so that a problem arises that, for instance, the size of projector 500 enormously increases, accordingly. Hence, the thickness of wavelength conversion member 10 is preferably in a range from 50 μm to 700 μm, more preferably in a range from 80 μm to 500 μm, and yet more preferably in a range from 100 μm 300 μm, as described above.

Second Example

Next, the case in which the predetermined parameter indicates positions at which radiator fins 212 are disposed is to be described. More specifically, the case in which radiator fins 212 are provided on an inner metal film or an outer metal film is to be described. Note that in the second example, the thicknesses of the metal films (the thicknesses of main body 211, second metal film 22, third metal film 23, and fourth metal film 24 in the z-axis direction) are 100 μm, and the thickness of wavelength conversion member 10 is 200 μm. Also in the third example and the fourth example described below, the thicknesses of the metal films and the thickness of wavelength conversion member 10 are the same as those stated above.

Figure 7:
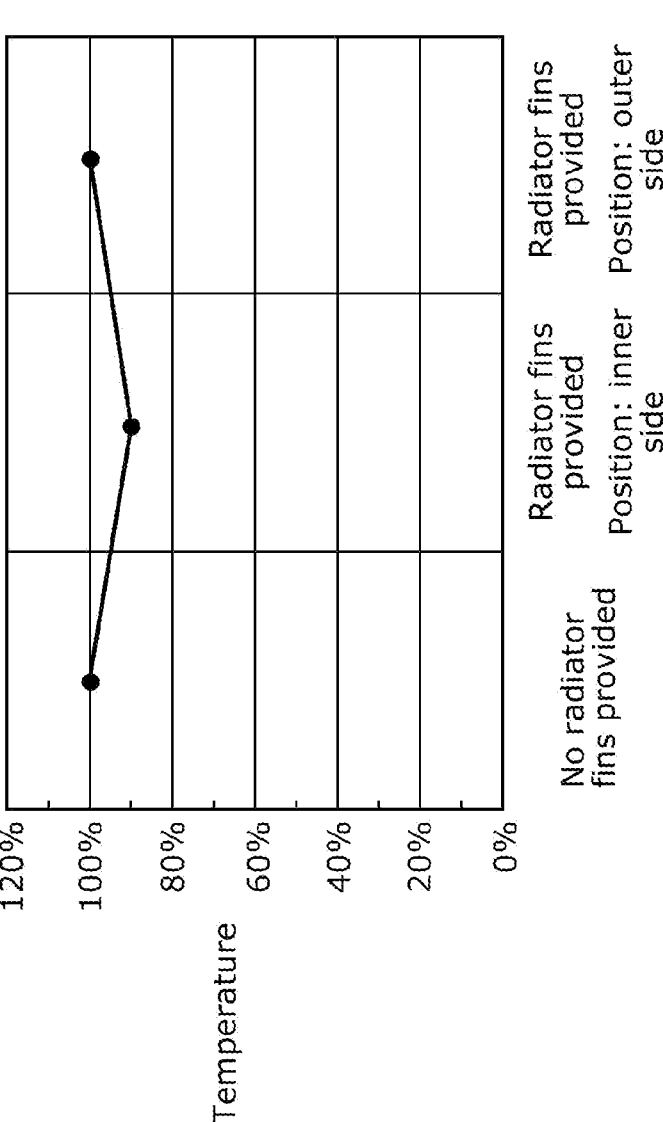
FIG. 7 illustrates a relation between a temperature of the wavelength conversion member and positions at which radiator fins are provided, according to the present embodiment.

FIG. 7 illustrates a relation between a temperature of wavelength conversion member 10 and positions at which radiator fins 212 are provided, according to the present embodiment.

Note that main body 211, second metal film 22, third metal film 23, and fourth metal film 24 are provided in all the cases where "No radiator fins provided", "Radiator fins provided Position: inner side", and "Radiator fins provided Position: outer side" shown in the graph illustrated in FIG. 7. Furthermore, "No radiator fins provided" shows the case in which none of radiator fins 212 is provided. Further, "Radiator fins provided Position: inner side" shows the case in which radiator fins 212 are provided on an inner metal film, whereas "Radiator fins provided Position: outer side" shows the case in which radiator fins 212 are provided on an outer metal film.

The vertical axis of the graph illustrated in FIG. 7 shows normalized values on the assumption that 100% indicates a temperature (degrees Celsius) in the case "No radiator fins provided" and 0% indicates 0 degrees Celsius.

FIG. 7 shows that in the case "Radiator fins provided Position: outer side", a temperature of wavelength conversion member 10 is substantially the same as the temperature in the case "No radiator fins provided". On the other hand, FIG. 7 shows that in the case "Radiator fins provided Position: inner side", a temperature of wavelength conversion member 10 is lower than the temperature in the case "No radiator fins provided".

Since radiator fins 212 are provided, air currents are generated when fluorescence emitting element 1 is rotated by, for instance, rotator 100 stated above. At this time, such air currents are generated from center point C1 of wavelength conversion member 10 toward the circumference of wavelength conversion member 10 having a circular shape.

As described above, in the present embodiment, radiator fins 212 are provided on first metal film 21 that is one of the inner metal films. In this case, the air currents flow toward region A1 that is irradiated with excitation light L1, and thereafter flows toward the circumference of wavelength conversion member 10. Thus, since heat generated in region A1 by being irradiated with excitation light L1 is cooled by the air currents, a rise in temperature of wavelength conversion member 10 can be reduced. Thus, since radiator fins 212 are provided on an inner metal film, heat dissipation of fluorescence emitting element 1 can be further enhanced.

Furthermore, radiator fins 212 extend radially in the plan view. Accordingly, when fluorescence emitting element 1 is rotated by, for instance, rotator 100, air currents having a higher flow velocity are generated. Accordingly, a rise in temperature of wavelength conversion member 10 can be further reduced since heat generated by being irradiated with excitation light L1 is readily cooled. Thus, since radiator fins 212 are provided radially, heat dissipation of fluorescence emitting element 1 can be further enhanced.

On the other hand, when radiator fins 212 are provided on an outer metal film (such as second metal film 22, for example), the air currents do not flow toward region A1. Thus, in this case, the cooling effect owing to the air currents is less likely to be yielded.

Third Example

Next, the case in which the predetermined parameter is thickness D of radiator fins 212 is to be described.

Figure 8:
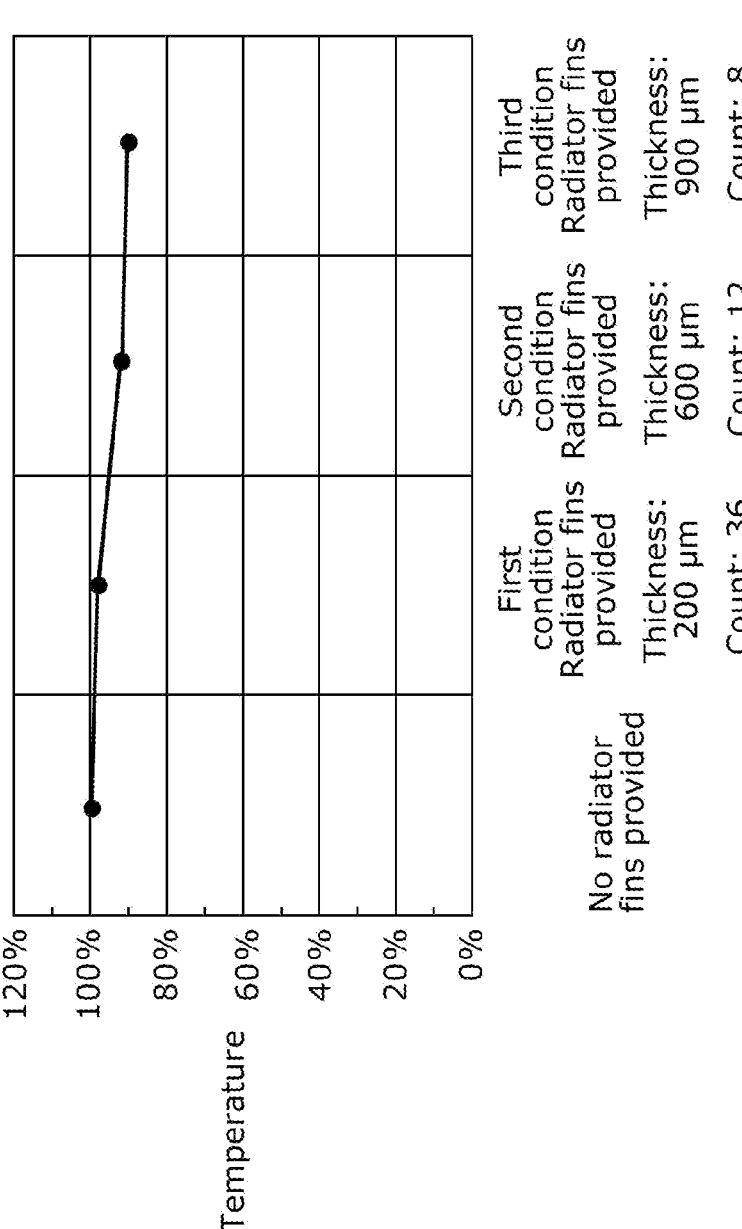
FIG. 8 illustrates a relation between a temperature of the wavelength conversion member and thicknesses of the radiator fins, according to the present embodiment.

FIG. 8 illustrates a relation between the temperature of wavelength conversion member 10 and thickness D of radiator fins 212, according to the present embodiment. In the third example, the temperature of wavelength conversion member 10 is calculated under four conditions. For convenience, "First condition Radiator fins provided Thickness: 200 μm Count: 36" in FIG. 8 is simply stated as "First condition". Similarly, "Second condition Radiator fins provided Thickness: 600 μm Count: 12" is simply stated as "Second condition", and "Third condition Radiator fins provided Thickness: 900 μm Count: 8" is simply stated as "Third condition".

Main body 211, second metal film 22, third metal film 23, and fourth metal film 24 are provided in all the cases "No radiator fins provided", "First condition", "Second condition", and "Third condition" shown in the graph illustrated in FIG. 8.

"No radiator fins provided" shows the case in which no radiator fins 212 are provided. Furthermore, for the three conditions, "First condition", "Second condition", and "Third condition", designs are created under the following conditions. In the three conditions, the shapes of radiator fins 212 are designed to have the same surface area of all radiator fins 212 (a total area of all the surfaces of radiator fins 212 that are in contact with atmosphere). Specifically, the surface area of all radiator fins 212 in "First condition", the surface area of all radiator fins 212 in "Second condition", and the surface area of all radiator fins 212 in "Third condition" are the same.

Here, in "First condition", thickness D of radiator fins 212 is 200 μm, and a count of radiator fins 212 is 36. In "Second condition", thickness D of radiator fins 212 is 600 μm, and a count of radiator fins 212 is 12. In "Third condition", thickness D of radiator fins 212 is 900 μm, and a count of radiator fins 212 is 8.

The vertical axis of the graph illustrated in FIG. 8 shows normalized values on the assumption that 100% indicates a temperature (degrees Celsius) in the case "No radiator fins provided" and 0% indicates 0 degrees Celsius.

FIG. 8 shows that the temperature of wavelength conversion member 10 is the highest when "No radiator fins provided", is the second highest under "First condition", is the second lowest under "Second condition", and is the lowest under "Third condition". When fluorescence emitting element 1 is rotated by, for instance, rotator 100, air currents having a higher flow velocity are generated as thickness D of radiator fins 212 is greater. Accordingly, the greater thickness D of radiator fins 212 is, the more a rise in temperature of wavelength conversion member 10 is reduced.

Furthermore, in the thickness direction (z-axis direction) of wavelength conversion member 10, thickness D of radiator fins 212 may be greater than the thickness of wavelength conversion member 10. For example, thickness D of radiator fins 212 is preferably in a range from 100 μm to 1500 μm, more preferably in a range from 200 μm to 1000 μm, and yet more preferably in a range from 400 μm to 800 μm. As illustrated in FIG. 8, when the condition is changed from "First condition" to "Second condition", the temperature of wavelength conversion member 10 greatly decreases. When the condition is changed from "First condition" to "Second condition" is when thickness D of radiator fins 212 is changed from 200 μm to 600 μm. Thus, the thickness of wavelength conversion member 10 according to the present embodiment is 200 μm, and if thickness D of radiator fins 212 is greater than the thickness of wavelength conversion member 10, a rise in temperature of wavelength conversion member 10 is more reduced. Hence, heat dissipation of fluorescence emitting element 1 can be more enhanced.

Fourth Example

Lastly, the case in which the predetermined parameter is a count of radiator fins 212 is to be described.

Figure 9:
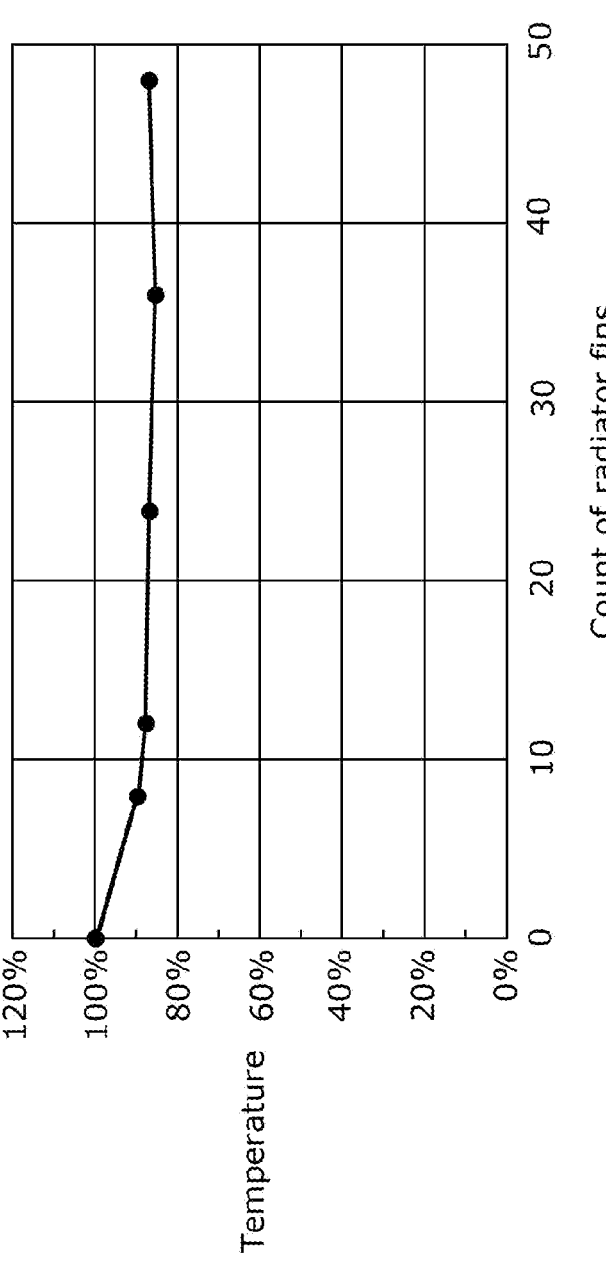
FIG. 9 illustrates a relation between a temperature of the wavelength conversion member and a count of the radiator fins, according to the present embodiment.

FIG. 9 illustrates a relation between the temperature of wavelength conversion member 10 and a count of radiator fins 212, according to the present embodiment. As described above, in the present embodiment, a count of radiator fins 212 is 8, and thus eight radiator fins 212 are provided.

Here, radiator fins 212 are provided on an inner metal film (for example, first metal film 21). Note that unlike the third example, all radiator fins 212 have the same thickness, irrespective of a count of radiator fins 212.

In the graph illustrated in FIG. 9, the vertical axis indicates a temperature of wavelength conversion member 10, whereas the horizontal axis indicates a count of radiator fins 212. The left end of the graph, that is, when a count of radiator fins 212 is 0 shows the case in which no radiator fins 212 are provided.

The vertical axis of the graph illustrated in FIG. 9 shows normalized values on the assumption that 100% indicates a temperature (degrees Celsius) in the case "No radiator fins 212 provided" and 0% indicates 0 degrees Celsius.

In FIG. 9, when a count of radiator fins 212 is increased from 0 to 8, the temperature of wavelength conversion member 10 decreases. Thus, since radiator fins 212 are provided, when fluorescence emitting element 1 is rotated by, for instance, rotator 100, air currents are generated, and thus a rise in temperature of wavelength conversion member 10 is reduced. Accordingly, heat dissipation of fluorescence emitting element 1 can be further enhanced.

If a count of radiator fins 212 is increased from 0 to 8, a temperature of wavelength conversion member 10 suddenly decreases. However, in a range of a count of radiator fins 212 from 8 to 48, the temperature of wavelength conversion member 10 is substantially the same. Thus, as shown by the present embodiment, heat dissipation of fluorescence emitting element 1 can be sufficiently enhanced by providing eight radiator fins 212.

[Manufacturing Method]

Here, a method for manufacturing fluorescence emitting element 1 is to be briefly described.

First, wavelength conversion member 10 is manufactured.

A fluorescent material included in wavelength conversion member 10 consists essentially of a crystalline phase represented by $(Y_{0.999}Ce_{0.001})_3Al_5O_{12}$. Further, the fluorescent material consists essentially of a $Ce^{3+}$ active fluorescent substance.

The following three raw materials are used as powdered chemical compounds to manufacture wavelength conversion member 10. Specifically, $Y_2O_3$ (purity 3N, Nippon Yttrium Co., Ltd.), $Al_2O_3$ (purity 3N, Sumitomo Chemical Co., Ltd.), and $CeO_2$ (purity 3N, Nippon Yttrium Co., Ltd.) are used.

First, the raw materials are weighted to obtain a chemical compound of stoichiometry $(Y_{0.999}Ce_{0.001})_3Al_5O_{12}$. Next, the weighted raw materials and alumina balls (having a diameter of 10 mm) are put into a plastic pot. The amount of alumina balls is sufficient to fill about ⅓ of the volume of the plastic pot. After that, pure water is put into the plastic pot, and the raw materials and the pure water are mixed using a pot rotator (manufactured by Nitto Kagaku Co., Ltd., BALL MILL ANZ-51S). The raw materials and the pure water are mixed for 12 hours. Accordingly, a slurried mixed raw material is obtained.

The slurried mixed raw material is dried using a drier. Specifically, a NAFLON® sheet is placed so as to cover the inner walls of a metal vat, and the mixed raw material is poured onto the NAFLON® sheet. The metal vat, the NAFLON® sheet, and the mixed raw material are processed for eight hours in the drier that is set to 150 degrees Celsius and dried. After that, the dried mixed raw material is collected, and granulated using a spray dryer device. Note that when the raw material is granulated, an acrylic binder is used as an adhesive (a binder).

The granulated mixed raw material is temporarily molded into a cylinder using an electric hydraulic press (manufactured by Riken Seiki Co., Ltd., EMP-5) and a cylindrical metal mold. The pressure applied when the raw material is molded is set to 5 MPa. Next, the temporarily molded raw material is firmly molded using a cold isostatic press. The pressure applied when the raw material is firmly molded is set to 300 MPa. Note that the raw material firmly molded is subjected to heat treatment (binder removal treatment) in order to remove the adhesive (binder) used when the raw material is granulated. The temperature for the heat treatment is set to 500 degrees Celsius. Furthermore, the time for the heat treatment is set to 10 hours.

The molded raw material subjected to the heat treatment is baked using a tube atmospheric furnace. The baking temperature is set to 1675 degrees Celsius. The baking time is set to 4 hours. The baking atmosphere is a mixed gas atmosphere of nitrogen and hydrogen.

The cylindrical baked product is sliced using a multi-wire saw. The thickness of the sliced cylindrical baked product is about 700 μm.

The sliced baked product is ground using a grinding device to adjust the thickness of the baked product. By making this adjustment, the baked product becomes wavelength conversion member 10. The thickness of wavelength conversion member 10 is adjusted so as to be reduced to 200 μm.

Subsequently, nickel films are formed on and metal films are formed over wavelength conversion member 10.

Here, the nickel films are formed on wavelength conversion member 10, and thereafter the metal films are further formed in contact with the nickel films. The nickel films and the metal films are formed by a dry process or a wet process, but are formed using electroplating as an example.

OTHER EMBODIMENTS

The above has described, for instance, fluorescence emitting element 1 according to the present invention, based on the embodiments, but nevertheless the present invention is not limited to those embodiments. The scope of the present invention includes embodiments resulting from applying various modifications, which may be conceived by those skilled in the art, to the embodiments, and other embodiments constructed by combining some elements in the embodiments, without departing from the gist of the present invention.

Fluorescence emitting element 1 includes wavelength conversion member 10, the metal films, and the nickel films, yet the elements included therein are not limited thereto.

For example, fluorescence emitting element 1 may include wavelength conversion member 10 and a single metal film (third metal film 23, for example). Also in this case, heat dissipation of fluorescence emitting element 1 can be enhanced. Thus, a rise in temperature of wavelength conversion member 10 due to being irradiated with excitation light L1 can be reduced. Accordingly, a thermal quenching phenomenon does not readily occur, and thus a decrease in fluorescence can be reduced. Hence, fluorescence emitting element 1 that achieves high efficiency of light usage can be provided.

Note that as described above, fluorescence emitting element 1 according to the present embodiment does not include, for instance, an element that supports wavelength conversion member 10 (the transparent substrate for fluorescence shown in PTL 1, for example). PTL 1 discloses that excitation light enters the substrate for fluorescence from the atmosphere. Furthermore, the excitation light that has entered the substrate for fluorescence passes through the substrate for fluorescence and enters the fluorescence generator, so that fluorescence is generated by the fluorescence generator. Thus, a portion of excitation light that enters the substrate for fluorescence from the atmosphere is reflected toward the atmosphere, due to a difference between the index of refraction of the substrate for fluorescence and the index of refraction of the atmosphere. Thus, loss of excitation light occurs at the interface between the substrate for fluorescence and the atmosphere.

However, in the present embodiment, fluorescence emitting element 1 according to the present embodiment does not include an element that supports wavelength conversion member 10, as described above. Accordingly, loss of excitation light L1 as stated above does not occur, and thus excitation light L1 that enters wavelength conversion member 10 increases. As a result, fluorescence generated by the fluorescent material in wavelength conversion member 10 increases. Thus, efficiency of light usage achieved by fluorescence emitting element 1 can be further increased.

Fluorescence emitting element 1 may have a substrate that supports wavelength conversion member 10, on the contrary to the description above. The substrate may be a highly light-transmissive substrate. For the substrate, a glass plate such as a soda-lime glass, a low-alkali borosilicate glass, or an alkalifree alumino borosilicate glass, for example, can be used. Further, a resin plate such as a polycarbonate plate, an acrylic based resin plate, or a polyethylene terephthalate plate can be used. Furthermore, a flexible material such as a film can be used for the substrate, in addition to a plate made of a hard material such as a glass or resin plate. If a highly light-transmissive substrate is provided, fluorescence emitting element 1 can be used as a light-transmissive fluorescent wheel.

In the above embodiment, only first metal film 21 that is an inner metal film includes radiator fins 212, yet the present disclosure is not limited thereto. Specifically, first metal film 21 that is an inner metal film may include radiator fins 212, and second metal films 22 that is an outer metal film may include radiator fins.

For example, the count of radiator fins included in second metal film 22 may be the same as or different from the count of radiator fins 212 included in first metal film 21. The radiator fins included in second metal film 22 may be disposed, extending radially about center point C1 of wavelength conversion member 10.

In this manner, the inner and outer metal films may each include a plurality of radiator fins. Accordingly, the surface areas of first metal film 21 and second metal film 22 increase. An increase in the surface areas allows heat to be more readily dissipated from first metal film 21 and second metal film 22, and thus can further enhance heat dissipation of fluorescence emitting element 1.

Note that fluorescence emitting element 1 may include a dichroic film that transmits excitation light L1 and reflects fluorescence, which is provided closer to first principal surface 11 of wavelength conversion member 10 than to second principal surface 12, in order to increase excitation efficiency and light extraction efficiency. A dichroic film may be a $Ta_2O_3/SiO_2$ multi-layer film or may be a $TiO_2/SiO_2$ multi-layer film, but is not limited thereto. Further, fluorescence emitting element 1 may include an anti-reflective (AR) film that is provided closer to second principal surface 12 of wavelength conversion member 10 than to first principal surface 11.

Various changes, replacement, addition, and omission, for instance, can be made to the above embodiments within the scope of the claims and the equivalents thereof.

REFERENCE SIGNS LIST

1 fluorescence emitting element
10 wavelength conversion member
11 first principal surface
12 second principal surface
21a, 22a, 23a, 24a bonding surface
21b, 22b, 23b, 24b exposed surface
200 light emitter
212 radiator fin
300 fluorescence emitting module
A1 region
L1 excitation light

The invention claimed is:

1. A fluorescence emitting element comprising:
a wavelength conversion member that is plate-shaped and includes a fluorescent material, the wavelength conversion member including a first principal surface and a second principal surface that is on an opposite side from the first principal surface; and
a metal film bonded to at least one surface out of the first principal surface and the second principal surface,
wherein in a plan view of the wavelength conversion member, the wavelength conversion member includes a region that does not overlap the metal film,
the metal film includes a bonding surface that is bonded to the at least one surface, and an exposed surface on an opposite side from the bonding surface,
the region that does not overlap the metal film includes the fluorescent material,
the metal film includes a plurality of radiator fins, and
in a thickness direction of the wavelength conversion member, a thickness of the plurality of radiator fins is greater than a thickness of the wavelength conversion member.

2. The fluorescence emitting element according to claim 1,
wherein the plurality of radiator fins are provided closer to the first principal surface than to the second principal surface.

3. The fluorescence emitting element according to claim 1,
wherein the metal film consists essentially of copper.

4. The fluorescence emitting element according to claim 1, further comprising:
a nickel film provided between the metal film and the wavelength conversion member.

5. A fluorescence emitting module comprising:

the fluorescence emitting element according to claim 1; and a light emitter that emits excitation light that excites the fluorescent material and enters the region through the first principal surface.

6. A light emitting device comprising:

the fluorescence emitting module according to claim 5.

7. A fluorescence emitting element comprising:

a wavelength conversion member that is plate-shaped and includes a fluorescent material, the wavelength conversion member including a first principal surface and a second principal surface that is on an opposite side from the first principal surface; and a metal film bonded to at least one surface out of the first principal surface and the second principal surface, wherein in a plan view of the wavelength conversion member, the wavelength conversion member includes a region that does not overlap the metal film, the metal film includes a bonding surface that is bonded to the at least one surface, and an exposed surface on an opposite side from the bonding surface, the metal film includes a plurality of radiator fins, in the plan view of the wavelength conversion member, the plurality of radiator fins extend radially, and in a thickness direction of the wavelength conversion member, the plurality of radiator fins each have a thickness greater than a thickness of the wavelength conversion member.

* * * * *